United States Patent [19]

Lender

[11] 3,746,787

[45] July 17, 1973

[54] DIGITAL METHOD OF GENERATING A CONTINUOUS PHASE FSK LINESIGNAL IN RESPONSE TO AN ASYNCHRONOUS BINARY INPUT SIGNAL

[75] Inventor: Adam Lender, Palo Alto, Calif.

[73] Assignee: GTE Automatic Electric Laboratories Incorporated, Northlake, Ill.

[22] Filed: Dec. 3, 1970

[21] Appl. No.: 94,657

[52] U.S. Cl. .................................. 178/66 A, 325/30

[51] Int. Cl. .................................. H02b 1/00

[58] Field of Search .................. 178/66 R, 67, 66 A; 325/30, 163, 320; 332/14

[56] References Cited

UNITED STATES PATENTS

| | | | |
|---|---|---|---|
| 3,142,723 | 7/1964 | Fleming | 325/30 |
| 3,588,348 | 6/1971 | Bowling | 178/66 |
| 3,518,552 | 6/1970 | Carlow | 325/163 |
| 3,417,332 | 12/1968 | Webb | 325/163 |
| 3,614,624 | 10/1971 | Scarpino | 178/66 |
| 3,223,925 | 12/1965 | Florac, Jr. et al. | 178/66 |

*Primary Examiner*—Robert L. Griffin
*Assistant Examiner*—Barry Leibowitz
*Attorney*—Kurt Mullerheim, Leonard R. Cool, Russell A. Cannon and Theodore C. Jay, Jr.

[57] ABSTRACT

In a data transmission system capable of accepting an asynchronous data input and generating an FSK line signal in response to the asynchronous input, a logic processor accepts as one input the asynchronous data signal or binary facsimile signal, as a second input a frequency that is N times the frequency difference between the two frequencies which represent the two binary states, i.e., mark or space, and as a third input a frequency that is N times the frequency which represents the lower of the two frequencies representing the two binary states. The signals are combined in digital logic circuits to satisfy the logic relation D = AB+C where the plus indicates here Exclusive-OR addition. This results in a square wave output D that provides one of three possible output frequencies. Next the modulated wave is divided down in a binary counter to place the wave in the desired portion of the frequency band. This process suppresses substantially the third output frequency which is not desired, leaving only the two frequencies representing two binary states. Thus the two principal frequencies of the FSK signal are obtained at the output of the frequency divider, and the FSK signal has substantially continuous phase.

8 Claims, 8 Drawing Figures

INVENTOR
ADAM LENDER
BY Leonard R. Cool
AGENT

DIGITAL METHOD OF GENERATING A CONTINUOUS PHASE FSK LINESIGNAL IN RESPONSE TO AN ASYNCHRONOUS BINARY INPUT SIGNAL

BACKGROUND OF THE INVENTION

1. Field of the Invention

The invention pertains to any slow or high speed data transmission system which employs frequency shift keying. Such systems are used, for example, in the transmission of carrier telegraph or facsimile information and thus the data signal is commonly asynchronous.

2. Description of the prior art

Data transmission systems which are capable of transmitting synchronous or asynchronous data are well known and it is well known to use the FSK form of modulation for the transmission of information over wire facilities or carrier telephone channels. This form of modulation is also called FM but in either case where a binary data input is employed, such as in the subject application, the result of the modulation process is either one of two frequencies which are transmitted on the line. One frequency represents the binary 1 or mark condition and the other frequency represents the binary 0 or space condition. This convention can be easily reversed. With respect to synchronous FSK systems, techniques for improving the quality and reducing costs have been effected by applying digital techniques. Such techniques readily lend themselves to integrated circuit implementation. One such technique using digital techniques is described in my U.S. Pat. No. 3,406,255 entitled "Data Transmission Techniques Using Orthogonal FM Signal." However, when it comes to asynchronous binary data systems this technique, as well as other digital binary FSK techniques, are inapplicable.

In the past asynchronous binary data systems have employed analog techniques. One method of deriving the FSK signals and which is commonly used for FSK systems is to alternately connect the output of one of two oscillators to the line in response to the binary data input. The frequency separation of the two oscillators is that required for the necessary frequency deviation. Unfortunately, when the shift in frequency is obtained by shifting between two oscillators difficulty is experienced due to transients arising from the sudden phase discontinuities caused by the switching and, though filtering may be used, the overall result is a system of high inherent distortion. To eliminate such distortion the available bandwidth must be increased to nearly twice the value compared to the system with continuous phase. These subjects have been analyzed in an article by William R. Bennett and S. O. Rice entitled "Spectral Density and Autocorrelation Functions Associated With Binary Frequency-Shift Keying," Bell System Technical Journal, Vol. 42, Sept. 1963, pages 2,355–2,387. In order to minimize the distortion effects discussed in the above referenced article, many techniques have been employed. One such technique is described in a U.S. patent to A. Minc, "Digital Keyer for Converting D.C. Binary Signals Into Two Different Output Audio Frequencies," U.S. Pat. No. 3,271,588. In this referenced patent two separate oscillators are used to provide the marking and spacing frequencies which represent the two states of the binary data input signal, and these frequencies are gated one at a time under control of a trigger circuit which is in turn controlled by the input data. What was done here to reduce the effects of distortion was to use much higher frequencies than were required for the line frequencies for each of the two separate oscillators and to divide the resultant frequencies down in order to arrive at the line frequencies so that the distortion effects were thus minimized.

The asynchronous binary data systems which use analog techniques are rather cumbersome and therefore, relative to the digital techniques, expensive. As explained in the references cited above for typical FSK modulation, a pair of different frequency sources are often needed for each channel as in the Minc patent. This is true not only for facsimile but also for the carrier telegraph systems as well as data systems. Further, in carrier telegraph systems — used hereinafter in a general sense to denote all systems of the kinds just mentioned — a multiplicity of channels, each of which operate at a different line frequency, are employed to subdivide the communications channel into a number of telegraph channels. Each telegraph channel must be independent of the others as far as its sources of frequencies are concerned because of the use of two different frequencies for each channel. Consequently, each channel in a carrier telegraph system requires two separate frequency sources and no two channels have an identical pair of frequency sources; for example, if the bit rate is 110 bits per second and frequency shift between one and zero is 70 Hz and a spacing of the carriers (or channel spacing) is 170 Hz, the lowest frequency channel uses frequencies of 390 Hz and 460 Hz as the marking and spacing frequencies. The next higher channel would use 560 Hz and 630 Hz as the marking and spacing frequencies. By so doing perhaps as many as 18 channels, which would require 36 different frequency sources, could be transmitted over a single telephone voice channel. Such would be the case with the Minc patent, for example. The problem of providing the oscillators for the generation of 36 different frequencies is another serious disadvantage of using two separate frequency sources for each channel since the cost is relatively high.

SUMMARY OF THE INVENTION

It is an object of my invention to reduce the time jitter distortion by using digital techniques to derive the FSK signal. It is a further object of my invention to reduce the cost, size and complexity of the transmitter by the use of digital circuits which may be easily obtained in integrated form. It is another object of the invention to make it possible in carrier telegraph or the like systems to use, if desired, a single frequency to determine the line frequency of the frequency shift keyed signal for each channel, thus reducing the overall number of oscillators required in the system.

According to this invention a frequency shift keyed signal is derived using a digital logic process. Because the generated FSK signal is in the form of a square wave, a frequency selective device such as a bandpass filter may be used to minimize extraneous signal amplitudes of odd harmonics that may be present. There are three signal inputs to the logic circuitry representing the digital logic processor. The first is the binary data signal, also identified by the letter A, which may be either synchronous or asynchronous. The second is a frequency that is N times the peak-to-peak frequency difference between the two line frequencies of the FSK wave that represents the mark and space conditions of the binary data signal, also identified by the letter B. In equation form, $B = N \times LF$ where N can be any integer greater than one and LF is equal to the peak-to-peak frequency difference of the FSK line signal. It has been found in practice that $N = 256$ is a practical and reasonable minimum for voice frequency telegraph circuits to assure phase continuity but it could be larger. The number 256 is convenient for a binary counter but any number can be used such as 250, 200, 300, etc. The distortion improvement approaches a maximum when N approaches infinity. The third signal is a high frequency signal, also identified by the letter C, which has a frequency $C = N \times HF$ where HF is the lower of the two line frequencies and N is as defined before. HF frequency is also numerically equal to the channel center frequency minus half of LF as defined before. These three signals are combined in the logic circuitry according to the following truth table.

TABLE I

| 3 Inputs A | B | C | Output to Counter D |
|---|---|---|---|
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |

Using the minimization procedure of Karnaugh, as described in his article "The Map Method for Synthesis of Combinational Logic Circuits," Transactions AIEE, Vol. 72, Part I, 1953, pp. 593–598, we get:

$$D = \bar{A}C + \bar{B}C + AB\bar{C} =$$
$$= (\bar{A} + \bar{B})\,C + AB\bar{C} =$$
$$= (\overline{AB})\,C + (AB)\,\bar{C} =$$
$$= AB \oplus C, \text{ where } \oplus = \text{Exclusive-OR}.$$

The resulting output signals, identified by the letter D, from the logic processor are in binary form. For one condition of the binary data input signal, $D = N \times HF$, i.e., it is N times the lower frequency of the FSK line signal. For the other condition of the binary input signal the output is $D = N(HF \pm LF)$ which is the equivalent of the output from a suppressed carrier amplitude modulator having a frequency equal to HF. Thus the logic process provides three basic output frequencies but two of these contain the same information. These latter are herein called sideband frequencies. It is desirable to eliminate one of these sideband frequencies to reduce the transmission bandwidth required and to simplify recovery of the binary information. It is also necessary to reduce the frequency to that desired for the line frequencies of the system. Therefore, a divider is employed to reduce the frequencies by dividing by N. In addition to reducing the frequencies by N, it has been discovered that a divider substantially suppresses the lower sideband frequency so that the output from the divider is either HF or (HF + LF), i.e., (HF − LF) is substantially suppressed. This result obtains even if the divider is a single flip-flop. However, suppression is greater as N is increased or as the number of counter stages is increased. For example, a single counter stage suppresses the lower sideband by approximately 13 dB relative to the upper sideband. Two counter stages provide approximately 17 dB suppression, three counter stages 23 dB and four counter stages 36 dB, and so on. These numbers, as such, are not important but what is important is the fact that the degree of suppression is a monotonic function of the counter stages and the suppression goes up very rapidly as the number of counter stages is increased. As a result an FSK signal is derived using digital techniques and the inherent time jitter distortion of systems using two oscillators has been essentially eliminated and, most important, the phase continuity is obtained so that the spectral density is reduced nearly by half compared to discontinuous phase.

DETAILED DESCRIPTION OF THE INVENTION

Figure 1:
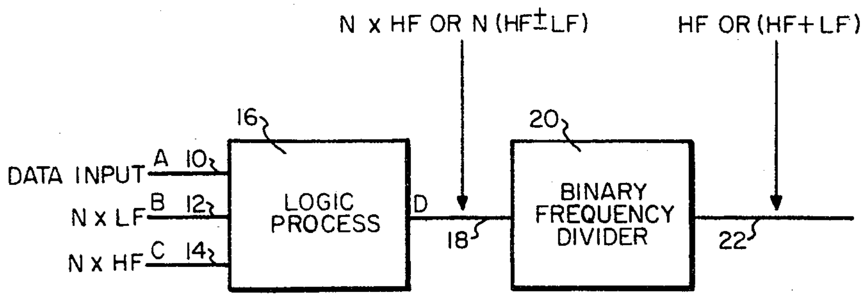
FIG. 1 is a generalized block diagram of an FSK arrangement for generating line signals according to the teachings of my invention.

The digital generation of a continuous phase, quasi-synchronous FSK line signal may be accomplished by the circuit arrangement illustrated in FIG. 1. The input data A, however, applied via lead 10 to logic processor 16 may be either synchronous or asynchronous. Input frequencies $B = N \times LF$ and $C = N \times HF$ may be square wave sources and these frequencies provide the timing for the logic processing so that an additional timing clock frequency is not required. Further, the N × LF and N × HF sources operate continuously. If only the base frequencies, i.e., LF and HF, were used considerable distortion would result because of noncoherent addition of the various products which result from the logic processing. In this case the granularity, i.e., the time jitter distortion, at the transition points would be prohibitive, precluding satisfactory operation. It must be remembered that here linear analog modulation is being accomplished using nonlinear digital circuits. To get away from this granularity effect, to make the system quasi-synchronous and to assure coherent addition of all products, the LF and HF base frequencies must be increased. When the multiplier N approaches infinity we would approach a nearly ideal synchronous system. For a finite value of N the system is nearly synchronous or what is herein called quasi-synchronous provided N is sufficiently high. Practical experiments in the terms of the well-known "eye pattern" for a random signal using the teachings of this invention indicate that when $N = 256$ the signal is substantially synchronous. For this case the eye patterns of a synchronous system and the quasi-synchronous system of my invention are indistinguishable for $N = 256$ or for a greater value of N, of course.

The base frequency LF is derived from the required peak-to-peak frequency difference between the two frequencies of the line signal. In equation form:

$$LF = \left| f_m - f_s \right|$$

where, $f_m$ is the line frequency representing the mark signal, and $f_s$ is the line frequency representing the space signal. The absolute value is taken since either $f_m$ or $f_s$ may be the higher frequency. In a commonly known carrier telegraph application a system used to transmit data at 110 b/s uses a frequency shift of ±35 Hz from the center frequency, $f_c$. The peak-to-peak frequency difference of 70 Hz is the base frequency LF. The pulse rate required at input 12 is then $N \times LF = 256 \times 70 = 17{,}920$ Hz for a quasi-synchronous system. Note that for a carrier telegraph system the same peak-to-peak frequency difference may be, and often is, used for all channels. Thus, a single square-wave oscillator may be employed to supply this base frequency to each channel transmitter. The base frequency HF will also be the lower of the two FSK line frequencies as will be explained later. Thus, HF may be derived from the following formula:

$$HF = 425 - (70/2) = 390 \text{ Hz.}$$

The minimum recommended frequency applied to input lead 14 is:

$$N \times HF = 390 \times 256 = 99{,}840 \text{ Hz.}$$

The three signals, data input, N × LF and N × HF are applied to logic processor 16 via leads 10, 12 and 14, respectively. The letters A, B and C are used to represent the respective signals in the equations which define the logic process and these are labelled on the diagram. These same letters were also used in Table I, above. Techniques for implementing the logic process will be described later.

The result of the logic process if a square wave output signal, D, having either a carrier which is equal to N × HF or sidebands which are similar to those obtained from a suppressed carrier amplitude modulation process. These sidebands are then equal to N(HF ± LF).

The signal D is applied via lead 18 to a frequency divider 20. The frequency divider can take the form of the well-known counters in which each stage divides the input frequency by two. Because this division process causes division as a power of two it is convenient to relate N to powers of two, for example, $N = 2^n$ where $n$ is any integer except zero although any number can be used. Thus for our example stated above, $n = 8$ so that $N = 2^8 = 256$. In this case, the number of counter stages required is equal to $n$. However, it is not necessary for proper operation of the invention that N be a power of two.

The frequency divider divides the modulated signals D by N and it would seem that the resultant should be either HF or (HF ± LF) on lead 22. However, the division process substantially reduces the lower sideband frequency, as hereinbefore explained, so that the output of divider 20 is either HF or (HF + LF) still in square waveform. Thus an FSK line signal has been generated using digital techniques.

Figure 2A:
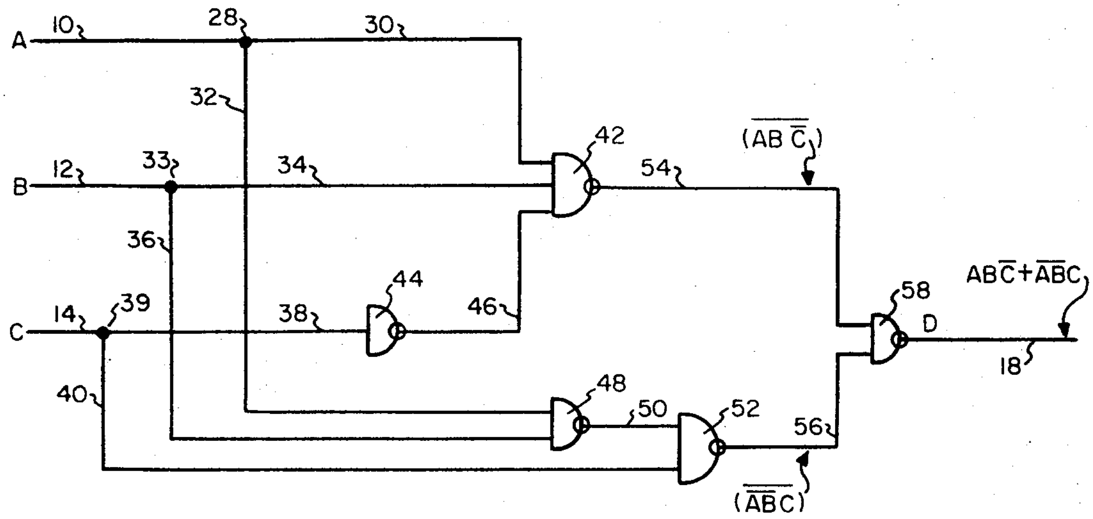
FIG. 2A is a simplified block diagram of one digital logic circuit arrangement from which the necessary logic process can be obtained.
Figure 2B:
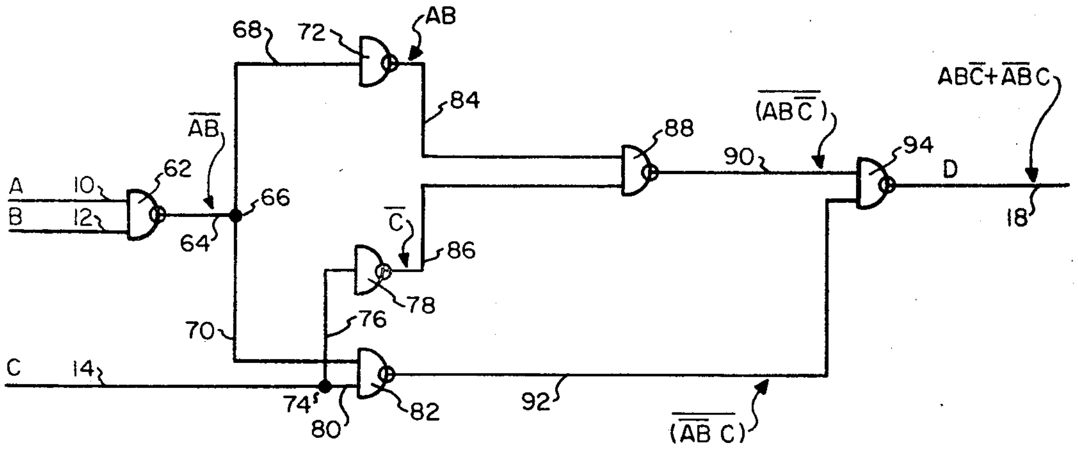
FIG. 2B is a simplified block diagram of a second digital logic circuit arrangement from which the necessary logic process can be obtained.

The circuitry used in logic processor 16 is derived from the logic expressions given above and implemented using discrete components or integrated circuits that are commercially available. Two different ways of implementing the logic process are illustrated in FIGS. 2A and 2B. In order to maintain identification of leads or circuit elements the same numbers are used for identification of the same lead or element in all of the figures. Further, the same letter identifications are used to indicate the point at which particular frequencies or modulated waves occur.

In FIG. 2A, one inverter and four NAND-gates are interconnected to satisfy the logic relation:

$$D = (AB)\overline{C} + (\overline{AB})C$$

Note that a separate clocking input to the logic circuits is not required. Where necessary, this function is performed by the N × LF or N × HF frequencies applied to the logic circuits. Referring to FIG. 2A the data input, A, is applied to one input of a three-input NAND-gate 42 via lead 30 and to one input of two-input NAND-gate 48 via lead 32. The N × LF frequency, B, follows a similar path being applied to the logic processor over lead 12 to junction 33 and thence via lead 34 to a second input of NAND-gate 42 and via lead 36 to the other input of NAND-gate 48. The third input, C, to NAND-gate 42 comes from N × HF via input lead 14, junction 39, lead 38, inverter 44 and lead 46. Because of the inversion of C the complement of C, i.e., $\overline{C}$, appears at the input to NAND-gate 42; and when $\overline{C}$ appears on lead 14, C appears at the input of NAND-gate 42. As is well known, NAND-gate 42 will have a 1 output for all input conditions except when all of the inputs are 1's.

Two-input NAND-gate 48 accepts separate inputs from data input A and low frequency B and provides a 1 output at the low frequency rate except when both A and B inputs are 1's. The output of gate 48 provides one input of the two-input NAND-gate 52 via lead 50. The second input to NAND-gate 52 is high frequency C via lead 14, junction 39 and lead 40. Gate 52 provides a 1 output at the high frequency rate except when both inputs are 1's, in which case the output on lead 56 is zero. In following the logic steps, a 0 will occur when the A and B product in gate 48 is a 0 since the gate output is then 1 and at the same time the input from C is a 1. The logic relationship is then expressed by $(\overline{\overline{AB}C})$ as indicated on lead 56 which provides one input of NAND-gate 58. The effect of NAND-gate 58 is to complement the inputs so that the output D on lead 18 is $(AB)\overline{C} + (\overline{AB})C$. Thus we have the effective sidebands represented by $(AB)\overline{C}$ or we have the carrier represented by $(\overline{AB})C$.

Another method of deriving the logic process is illustrated in FIG. 2B. In this case as before, the implementation can be accomplished by the use of discrete circuit components or by the use of commercially available integrated circuits. The A and B inputs on leads 10 and 12, respectively, are first combined in NAND-gate 62 to obtain the complement of the product $\overline{AB}$ on lead 64. The output $\overline{AB}$ is separated along two paths at junction 66. One such path is connected by lead 68 to inverter 72 to obtain an output AB on lead 84. The other such path is connected by lead 70 to one input of two-input NAND-gate 82. Here the $\overline{AB}$ signal is combined with C which is applied via lead 14, junction 74 and lead 80 to the other input of NAND-gate 82. This results in the complement of the inputs, i.e., $(\overline{\overline{AB}C})$ which appears at the output of the gate and is applied as one input to the two-input NAND-gate 94 via lead 92. From junction 74, C is connected to inverter 78 via lead 76 and the complement $\overline{C}$ is available at its output. The complement $\overline{C}$ is applied via lead 86 on the other input to NAND-gate 88. NAND-gate 88 thus has inputs of AB and $\overline{C}$ so that its output is $(\overline{AB\overline{C}})$ and is applied over lead 90 to the other input of NAND-gate 94. Again the result of the logic process at the output of NAND-gate 94 is $D = (AB)\overline{C} + (\overline{AB})C$ on lead 18 although arrived at by a different sequence of logic steps.

In either case, the high frequency signal, represented by C in the logic relationship, is the frequency present at the output whenever the data input A is in the spacing (0) state. When the data state of A is marking, i.e., a 1, phase reversals of the carrier occur and the sidebands are present. For this condition the pulse output of the logic circuit contains the sidebands surrounding the N × HF frequency.

Figure 3:
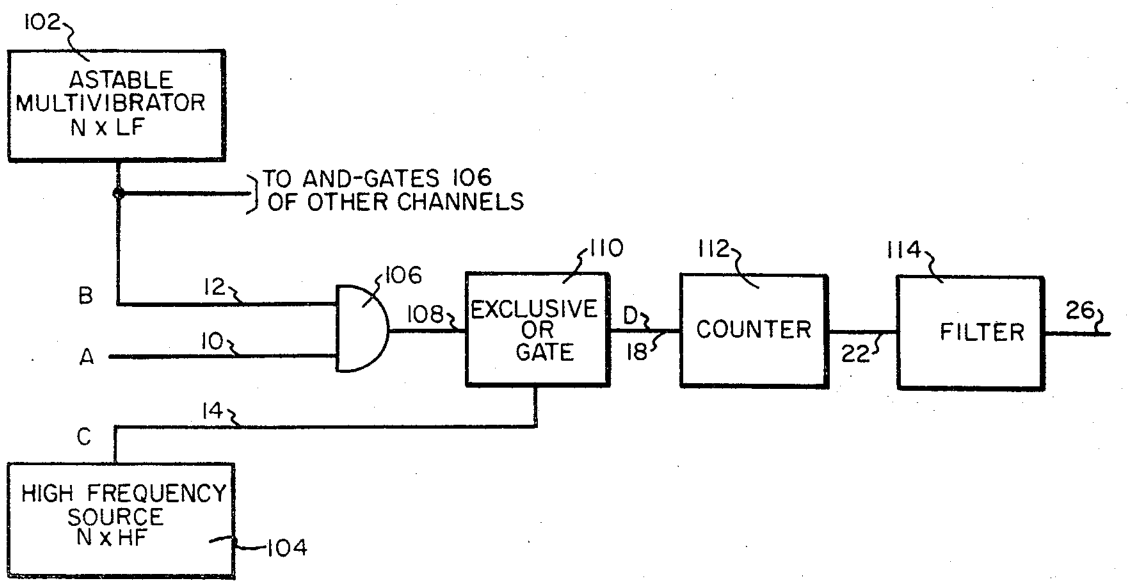
FIG. 3 is a simplified block schematic diagram of a carrier telegraph system employing the teachings of my invention. In the individual channel transmitters of the system, of which one has been schematically shown, the logic process is obtained by the co-action of an AND-gate and and Exclusive-OR gate. Both the low and high frequency oscillators are included. All of the digital circuits may be integrated using standard components that are commercially available.

FIG. 3 schematically illustrates a preferred embodiment of the invention in which the latter has been applied to a carrier telegraph system. In FIG. 3 the complete transmitter of one of the channels of this system has been shown in simplified block diagram form, together with the frequency source individually associated with this particular channel and another frequency source which is common to all the channels. The low frequency source 102 which is provided in common with all channels contains an astable multivibrator as the element used in deriving the N × LF pulse frequency. For the carrier telegraph channels referenced above a frequency of 17,920 Hz is used for each carrier telegraph channel. Such a frequency is readily obtainable using an astable multivibrator which is an integrated circuit. Further, the stability requirements for this oscillator are not particularly high being, for example, in the order of 1 part in 1,000 over a temperature range of 0° to 50°C. This and even greater accuracy is readily attained using a solid state astable multivibrator. The high frequency source 104 is separate for each channel and because it is a much higher frequency a crystal is used, in a manner known per se, to provide the required frequency stability. It is significant that in the preferred embodiment disclosed herein LF is identical for each channel. Only HF is different for each channel.

The data signal A is applied to one input of AND-gate 106 via lead 10. The low frequency, B, from source 102 is applied via lead 12 to the other input of AND-gate 106. The output of AND-gate 106 is applied to one input of Exclusive-OR gate 110 via lead 108 and the high frequency, C, from source 104 is connected to the other input of Exclusive-OR gate 110 via lead 14. This operative combination of AND-gate, Exclusive-OR gate and data and frequency sources performs the desired logic process so that, at the output of Exclusive-OR gate 110, the frequency relation D is obtained on lead 18. As before, D may be either N × HF or N(HF ± LF) depending upon the data input. An n stage counter 112 is employed to reduce the frequency down to that desired. The use of $N = 2^n$ is a matter of convenience and is not necessary for the proper operation of the invention. Regardless of the frequency division there will also be a suppression of the lower sideband by the counter. However, as hereinbefore explained, the suppression increases as N increases.

The final result of the frequency division of counter 112 is to obtain either the HF frequency or (HF + LF) frequency on lead 22 plus their odd harmonics since they are in square wave form. Odd harmonics of the frequency spectrum occurred and were measured for the third and fifth harmonics of the line frequencies. The third harmonic was approximately 10 dB below and the fifth was approximately 15 dB below the fundamental line frequencies. Because of the presence of these harmonics and because of the square wave characteristic of the digital modulation output, it may be desirable to use a filter to shape the wave and thus minimize the harmonics transmitted on the line. All that is necessary is to shape the square wave corners. This can be readily accomplished by a simple RC lowpass filter. Band limiting filter 114, FIG. 3, selects only the basic frequency components from those present so that an FSK signal is obtained on line 26. This FSK signal is quasi-synchronous and is used to transmit the original binary data information over telephone or carrier telephone facilities to a receiver. Reception of the wave and the recovery of the original binary data is not shown since it can be accomplished by techniques well known in the art.

Figure 4A:
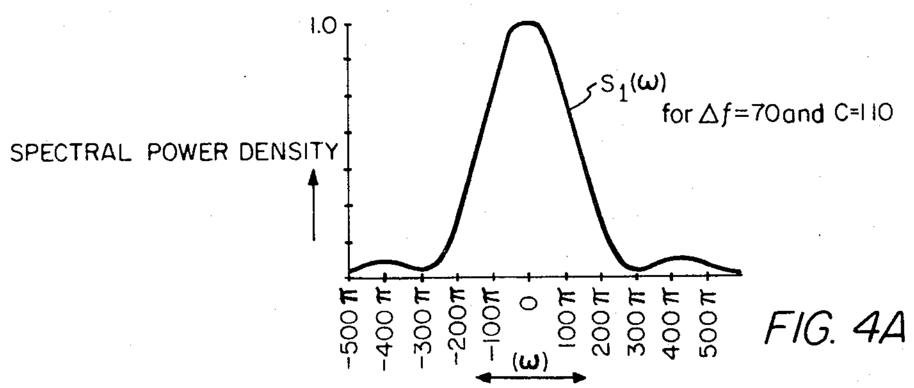
FIGS. 4A and 4B are graphs of the spectral distribution of an FSK signal generated by the older analog techniques and of an FSK signal generated according to the teachings of my invention, respectively. For both signals a bit speed of 110 b/s and a frequency deviation of ±35 Hz was employed.
Figure 4B:
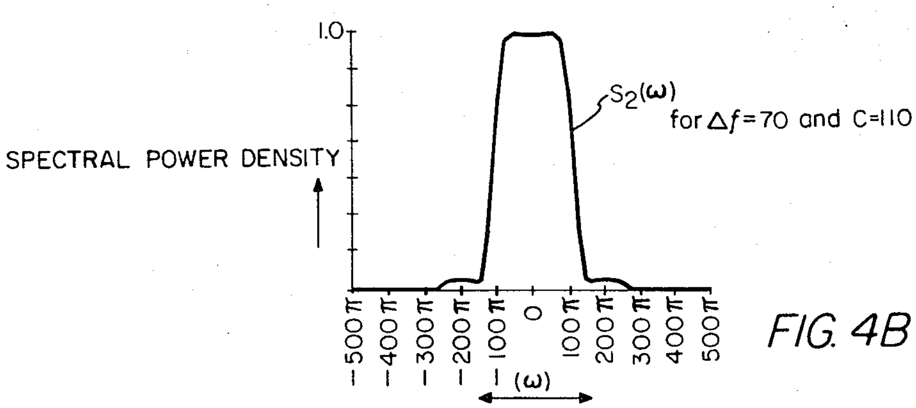
Figure 4C:
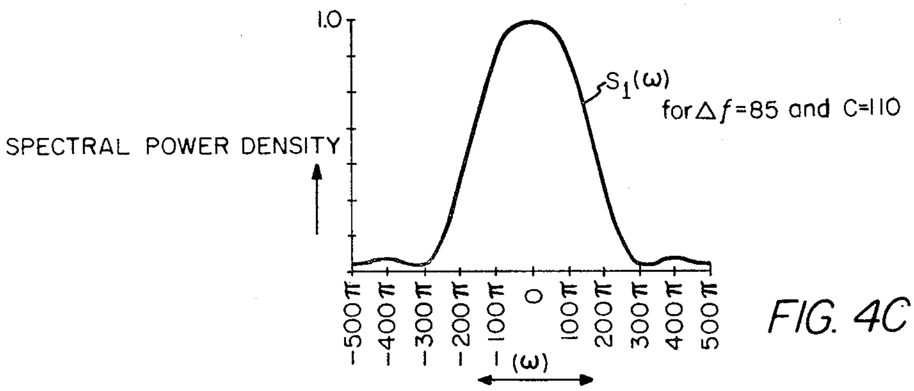
FIGS. 4C and 4D are graphs similar to those of FIGS. 4A and 4B, respectively. The bit speed is still 110 b/s but in this example the frequency deviation has been increased to ±42.5 Hz.
Figure 4D:
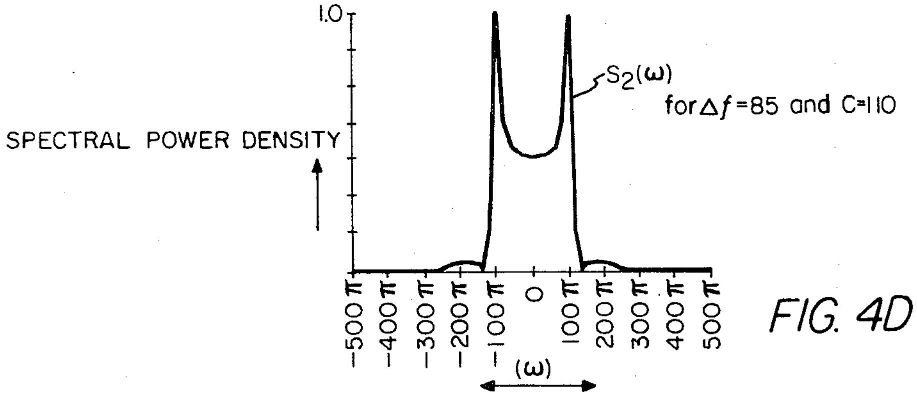

Reference is made at this point to FIGS. 4A to 4D which show typical power spectral densities for modulation techniques employing discontinuous phase and continuous phase. As previously indicated, the two graphs shown in FIGS. 4A and 4C and referenced $S_1(\omega)$ represent the spectral distribution of an FSK signal having discontinuous phase such as would be generated by the older analog technique, for frequency deviations of ±35 Hz and ±42.5 Hz, respectively. The two graphs in FIGS. 4B and 4D show the spectral distribution of an FSK signal having continuous phase such as would be generated in accordance with the teachings of the present invention, again for frequency deviations of ±35 Hz and ±42.5 Hz, respectively. The bit speed in all four cases was 110 b/s. These graphs were derived from the following equations which are the approximate expressions for the spectral density of a binary FSK signal.

$$S_1(\omega)=K_1\left[\left|\frac{\sin x}{x}\right|^2+\left|\frac{\sin y}{y}\right|\right]^2 \qquad (1)$$

for discontinuous phase $$S_2(\omega)=K_2K_3(\omega)\left[\left|\frac{\sin x}{x}\right|^2\cdot\left|\frac{\sin y}{y}\right|^2\right] \qquad (2)$$

for continuous phase where:

$S_1(\omega)$ = spectral power density for binary FM and discontinuous phase $S_2(\omega)$ = spectral power density for binary FM and continuous phase $\omega$ = frequency in radians/second $K_1$ = constant $X = (\omega - \omega_1)T/2$ $y = (\omega - \omega_2)T/2$ $\omega_1$ = Mark frequency (lower)

$\omega_2$ = Space frequency (upper)

These are arbitrary and can be reversed

T = bit duration in seconds $l/T$ = speed in bits per second $K_2$ = constant $K_3(\omega) = (\beta^2)/l - 2\cos(\omega + \alpha)T \cos\beta T + \cos^2 \beta T$ $\alpha = (\omega_2 + \omega_1)/2$ = carrier (center) frequency $\beta = (\omega_2 - \omega_1)/2$ = maximum frequency deviation from the carrier Expressions (1) and (2) reveal that the discontinuous phase spectral density is represented by a sum of sin $\mu/\mu$ functions, each centered at Mark and Space frequencies. The continuous phase in (2) is a product of the same functions. The product results in a narrower bandwidth than the sum. In fact, it is clear that in (1) the tails fell off as $l/f^2$ while in (2) they fell off as $l/f^4$. Consequently (1) requires appreciably greater bandwidth than (2). These graphs closely approximate the power spectrum as displayed on a spectrum analyzer. Thus, by the quasi-synchronous nature of the FSK signal derived by the teachings of this invention there is the added benefit of bandwidth conservation.

What is claimed is:

1. In a data transmission system, apparatus for generating an FSK line signal comprising:

a source of binary data signals A;

a low frequency source having a frequency B equal to N times the peak-to-peak frequency difference between the two frequencies comprising the FSK line signal where N is an integer greater than 1;

a high frequency source having a frequency C equal to N times the lower of the two frequencies of said FSK line signal;

logic means having three inputs and an output, said data source, low frequency source and high frequency source being operatively connected to respective ones of said inputs, said logic means digitally combining the inputs according to the logic relation: $D = (AB)\overline{C} + (\overline{AB})C$; and a frequency divider having a division characteristic equal to 1/N and having its input connected to the output of said logic means, said FSK line signal being obtained from the output of said divider.

2. Apparatus according to claim 1 in which said logic means comprises:

an inverter having its input connected to said high frequency source;

a three-input NAND-gate having one input connected to said data source, a second input connected to said low frequency source and the third input connected to the output of said inverter;

a first two-input NAND-gate having one input connected to said data source and the other input connected to said low-frequency source;

a second two-input NAND-gate having one input connected to the output of said first NAND-gate and the other input connected to the high frequency source; and a third two-input NAND-gate having one input connected to the output of said three-input NAND-gate and the second input connected to the output of said second two-input NAND-gate.

3. Apparatus according to claim 1 in which said logic means comprises:

a first two-input NAND-gate having one input connected to said data source and the other input connected to said low frequency source;

a second two-input NAND-gate having one input connected to the output of said first two-input NAND-gate and the other input to said high frequency source;

a first inverter connected to the output of said first two-input NAND-gate;

a second inverter connected to the high frequency source;

a third two-input NAND-gate having one input connected to the output of said first inverter and the other input connected to the output of said second inverter; and a fourth two-input NAND-gate having one input connected to the output of said second two-input NAND-gate and the other input connected to the output of said third two-input NAND-gate.

4. Apparatus according to claim 1 in which said logic means comprises:

an AND-gate having two inputs and an output, one input being connected to said data signal source and the other input being connected to said low frequency source; and an Exclusive-OR gate having two inputs and an output, one said input being connected to the output of said AND-gate and the other input being connected to the high frequency source.

5. Apparatus according to claim 4 in which said frequency divider comprises a counter having $\log_2 N$ stages.

6. Apparatus according to claim 4 further comprising:

a frequency selector connected to the output of said frequency divider for reducing the transmission of extraneous signals.

7. Apparatus according to claim 6 in which said frequency selector comprises a bandpass filter having a passband which passes those frequencies at and between the two frequencies of the FSK line signal with a minimum attenuation and rejects signals which are above or below the last-mentioned two frequencies.

8. In a carrier telegraph system having a plurality of channels, apparatus for generating FSK line signals for said channels such that for each said channel the peak-to-peak frequency difference between the two frequencies comprising the corresponding FSK line signal is the same, said apparatus including:

a plurality of logic means, one for each channel, each said means having three inputs and an output;

a plurality of sources of binary data signals A, one for each said channel;

a plurality of high frequency sources, each individual to a corresponding one of said channels and each having a frequency C equal to N times the lower of the two frequencies of the FSK line signal of the corresponding channel;

a low frequency source common to said plurality of channels and having a frequency B equal to N times said peak-to-peak difference where N is an integer greater than 1;

said three inputs of each said logic means being respectively connected to the corresponding data source, the corresponding high frequency source and said common low frequency source, and each said logic means digitally combining its three inputs according to the logic relation $D = \overline{A}\overline{B}C + AB\overline{C}$; and a frequency divider for each said channel, said divider having its input connected to the output of the corresponding logic means, and said FSK line signals being obtained from the output of the corresponding dividers.

* * * * *

UNITED STATES PATENT OFFICE
CERTIFICATE OF CORRECTION

Patent No. 3,746,787 Dated July 17, 1973

Inventor(s) Adam Lender

It is certified that error appears in the above-identified patent and that said Letters Patent are hereby corrected as shown below:

Page 1, [54] in the title, delete "LINESIGNAL" and insert therefor -- LINE SIGNAL --. Page 1 [57] in the abstract, line 12, delete "D = AB + C" and insert therefor -- $D = AB \oplus C$ --. Column 1, in the title, delete "LINESIGNAL" and insert therefor -- LINE SIGNAL --. Column 3, line 47, after "having a" insert -- carrier --; column 4, line 28, after "and" delete "and" and insert therefor -- an --. Column 5, line 32, after the words "following formula" start a new line and insert -- $HF = f_c - \frac{LF}{2}$ where the elements are as previously defined and $f_c$ = center frequency of the channel. The HF frequency thus changes for each carrier telegraph channel. If the center frequency, $f_c$, for the channel is 425 Hz and the peak-to-peak frequency, LF, is 70 Hz, as before, then --. Column 5, line 47, after "process" delete "if" and insert therefor -- is --. Column 8, line 67, delete "X =" and insert therefor -- x = --. Column 9, line 5, the script $\ell$ in $\ell/T$ should be a regular 1, viz., -- 1/T --; column 9, line 7, the script $\ell$ in "= $(\beta^2)/\ell$" must read -- $(\beta^2)/1$ -- (a regular one); column 9, line 17, the script $\ell$'s in $\ell/f^2$ and $\ell/f^4$ must be changed to regular ones, viz. -- $1/f^2$ -- and -- $1/f^4$ --.

Signed and sealed this 27th day of November 1973.

(SEAL)
Attest:

EDWARD M.FLETCHER,JR.
Attesting Officer

RENE D. TEGTMEYER
Acting Commissioner of Patents